US012582963B2

(12) United States Patent
Maloisel et al.

(10) Patent No.: US 12,582,963 B2
(45) Date of Patent: Mar. 24, 2026

(54) SEPARATION MATRIX AND METHOD OF SEPARATION

(71) Applicant: CYTIVA BIOPROCESS R&D AB, Uppsala (SE)

(72) Inventors: Jean-Luc Maloisel, Uppsala (SE); Jimmy Hedin Dahlström, Uppsala (SE); Marc Hummersone, Stevenage (GB); Ola Lind, Uppsala (SE); Sara Häggblad Sahlberg, Uppsala (SE); Jon Lundqvist, Uppsala (SE); Tania Ahmad, Uppsala (SE)

(73) Assignee: CYTIVA BIOPROCESS R&D AB, Uppsala (SE)

( * ) Notice: Subject to any disclaimer, the term of this patent is extended or adjusted under 35 U.S.C. 154(b) by 745 days.

(21) Appl. No.: 17/995,922

(22) PCT Filed: Apr. 16, 2021

(86) PCT No.: PCT/EP2021/059887
§ 371 (c)(1),
(2) Date: Oct. 10, 2022

(87) PCT Pub. No.: WO2021/219400
PCT Pub. Date: Nov. 4, 2021

(65) Prior Publication Data

US 2023/0191368 A1 Jun. 22, 2023

(30) Foreign Application Priority Data

Apr. 28, 2020 (GB) ...................................... 2006231

(51) Int. Cl.
*B01J 20/24* (2006.01)
*B01D 15/38* (2006.01)
(Continued)

(52) U.S. Cl.
CPC .......... *B01J 20/24* (2013.01); *B01D 15/3809* (2013.01); *B01D 15/3847* (2013.01);
(Continued)

(58) Field of Classification Search
CPC .... B01J 20/24; B01J 20/264; B01J 20/28004; B01J 20/28038; B01J 20/28085;
(Continued)

(56) References Cited

U.S. PATENT DOCUMENTS

| | | | |
|---|---|---|---|
| 8,530,698 | B2 | 9/2013 | Komiya et al. |
| 2019/0105632 | A1 | 4/2019 | Kupracz et al. |
| 2019/0308169 | A1 | 10/2019 | Hummersone et al. |
| 2020/0047086 | A1 | 2/2020 | Zhou |

FOREIGN PATENT DOCUMENTS

| | | | |
|---|---|---|---|
| CN | 104245078 | A | 12/2014 |
| JP | 2019-527617 | A | 10/2019 |

(Continued)

OTHER PUBLICATIONS

Office Action issued in corresponding Chinese application No. 202180031403.0, issued Jan. 27, 2024 (40 pages).

(Continued)

*Primary Examiner* — Kathryn Elizabeth Limbaugh
(74) *Attorney, Agent, or Firm* — Eversheds-Sutherland (US) LLP

(57) ABSTRACT

The invention discloses a separation matrix comprising a plurality of multimodal ligands covalently coupled to a support, wherein said support is a membrane comprising nonwoven polymer fibers and wherein said ligands are capable of interacting with a target biomacromolecule. Further, the invention discloses separation methods using the separation matrix.

34 Claims, 2 Drawing Sheets

(51) Int. Cl.
*B01D 65/02* (2006.01)
*B01D 69/02* (2006.01)
*B01D 69/14* (2006.01)
*B01D 71/16* (2006.01)
*B01J 20/26* (2006.01)
*B01J 20/28* (2006.01)
*B01J 20/32* (2006.01)

(52) U.S. Cl.
CPC ............. *B01D 65/02* (2013.01); *B01D 69/02* (2013.01); *B01D 69/147* (2013.01); *B01D 71/16* (2013.01); *B01J 20/264* (2013.01); *B01J 20/28004* (2013.01); *B01J 20/28038* (2013.01); *B01J 20/28085* (2013.01); *B01J 20/3212* (2013.01); *B01J 20/3219* (2013.01); *B01J 20/3278* (2013.01); *B01J 20/3293* (2013.01); *B01D 2325/0283* (2022.08); *B01D 2325/42* (2013.01)

(58) Field of Classification Search
CPC ................ B01J 20/3212; B01J 20/3219; B01J 20/3278; B01J 20/3293; B01J 20/28011; B01J 20/3253; B01J 20/3272; B01D 15/3809; B01D 15/3847; B01D 15/327; B01D 15/326; B01D 15/363; B01D 65/02; B01D 69/02; B01D 69/147; B01D 71/16; B01D 2325/0283; B01D 2325/42
See application file for complete search history.

(56) References Cited

FOREIGN PATENT DOCUMENTS

| | | | |
|---|---|---|---|
| WO | 2013068741 | A1 | 5/2013 |
| WO | 2013162449 | A1 | 10/2013 |
| WO | 2014077762 | A1 | 5/2014 |
| WO | 2017019874 | A1 | 2/2017 |
| WO | 2018/011600 | A1 | 1/2018 |
| WO | 2018011599 | A2 | 1/2018 |

OTHER PUBLICATIONS

Rajesh, Sahadevan et al., Synthesis of Cellulose-graft-Polypropionic Acid Nanofiber Cation-Exchange Membrane Adsorbers for High-Efficiency Separations, ACS Appl. Mater. Interfaces 2017, 9, 41055-41065.
JP First Office Action for corresponding Japanese Application No. 2022-565913, dated Mar. 11, 2025, 9 pages.
International Search Report and Written Opinion Issued in International Patent Application No. PCT/EP2021/059887, mailed Jul. 8, 2021 (13 pages).
Combined Search and Examination Report Issued in GB Patent Application No. GB2006231.1, mailed Nov. 9, 2020 (6 pages).
Daniel G. Bracewell, Guijun Ma, Mili Pathak, Anurag S. Rathore, "Re-use of Protein A Resin: Fouling and Economics", Mar. 1, 2015, BioPharm International, vol. 28, Issue 3. Retrieved at https://www.biopharminternational.com/view/re-use-protein-resin-fouling-and-economics.
Gottschalk, U. (2008). Biotechnol Prog, 24(3), 496-503.
O. Hardick, et al., J.Mater. Sci. 46 (2011) 3890.

SEPARATION MATRIX AND METHOD OF SEPARATION

CROSS REFERENCE TO RELATED APPLICATIONS

This application claims the priority benefit of PCT/EP2021/059887, filed Apr. 16, 2021, which claims the priority benefit to GB Application No. 2006231.1, filed Apr. 28, 2020, the entire contents of which are incorporated herein by reference.

TECHNICAL FIELD OF THE INVENTION

The present invention relates to separation matrices, and more particularly to adsorptive membrane matrices with multimodal ligands.

BACKGROUND OF THE INVENTION

The biotechnology market is the fastest growing sector within the world pharmaceutical market, accounting for 20% ($153 bn) of all market sales in 2012. This growth from 10% of the market share in 2002 is set to grow by 41% between 2012 and 2018 from $153 bn to $215 bn. There are currently around 200 monoclonal antibody (mAb) products on the market, and with over 1000 in clinical trials, the need for technological advancement in this area is clear. Over the last few decades typical fermentation titers of biomolecules in industrial settings have grown from 0.5 g/L--3 g/L, with levels of up to 10 g/L believed to be achievable in the near future based on activated advancements in molecular biology. Yet, while the downstream purification processes have also received some research and development, improvements in this area have not matched those in the upstream.

The manufacture of therapeutic proteins requires that a high degree of purity be achieved during processing so that the protein to be administered is substantially devoid of harmful contaminants. Currently, on industrial scale, chromatography is the dominant methodology used to achieve high purity proteins. The heavily relied on chromatography unit operations are, in economic terms, the key to advancements in the downstream processing of biomolecules, such as mAbs. Chromatography accounts for up to 60% of biotherapeutic processing (Re-use of Protein A Resin: Fouling and Economics, Mar. 1, 2015 BioPharm International, Volume 28, Issue 3, Anurag S. Rathore, Mili Pathak, Guijun Ma, Daniel G. Bracewell).

Such chromatographic separations involve binding of i) the target molecule and/or, ii) one or more impurities, to a solid phase when a liquid phase containing the target molecule and impurities is contacted with the solid phase. The interaction between target molecule/impurities and the solid phase can be based on charge, hydrophobicity, affinity or a combination thereof.

Historically, conventional packed bed chromatography using porous beads has been an extremely powerful separation tool. The porous nature of these beads yields a high surface area for binding either target or impurity. This results in a high capacity material, meaning a smaller amount of adsorbent material can be used. High capacities also increase the concentration effect achieved during the separation as more target can be bound per unit volume of adsorbent compared to the relative concentration of the load suspension. These aspects are critical for industrial scale processing where several kilograms of material might need to be purified per batch from liquid volumes that can reach up to 20,000 L. Typical binding capacities for porous beads are in the region of 35-120 mg/mL dependent on the functionality of the solid phase and species bound.

In a porous bead-based system, the binding event between target molecule/impurity and the solid phase is dependent on diffusion into the porous bead. There is therefore a strong correlation between the residence time in a porous bead-based system and flowrate. Thus, binding capacity drops off with decreasing residence times. This in turn is accompanied by rapid reduction of capacity where times of less than 2 minutes are used in a porous bead-based system. The high flowrates required for short residence times can also be incompatible with porous beads, particularly at manufacturing scale where many liters of bead suspension are packed into a column. Here the mechanical instability of the porous beads can lead to compression or collapse events, which in turn results in a non-homogeneous column bed.

With flowrate impacting the residence time it is critical to maximize the amount of target that can be bound to the solid phase per unit time. This allows either smaller adsorbent volumes to be used and/or the separation to be performed in less time. This metric can be defined as grams bound, per unit volume, per unit time (mg/mL/min). The typical binding capacities and residence times for porous beads discussed above result in overall productivities for single column porous bead systems around 10-120 mg/mL/min.

As alternatives to porous bead-based systems, monoliths or membranes may be used. The flow through such materials is convective rather than diffusional, and their binding capacity is therefore far less sensitive to flow than porous bead-based systems. These materials can be run at far higher flowrates than porous bead-based materials, where typical residence times are in the order of 0.2-0.5 minutes. However, typical binding capacities at 10% breakthrough of target for monoliths (10-20 mg/mL) and membranes (7.5-29 mg/mL) under dynamic flow are lower than porous beads (Gottschalk, U. (2008). Biotechnol Prog, 24(3), 496-503). The inferior binding capacity of monolith and membrane materials (compared to porous bead-based materials) can be offset to some extent by utilizing higher flowrates.

The typical binding capacities and residence times for monoliths and membranes discussed above result in overall productivities of the binding event for monolith and membrane systems around 10-145 mg/mL/min.

There exists a need for chromatography materials which share high binding capacity associated with porous bead-based materials and higher flowrates that are achievable with monolith/membrane materials. Such a material would offer high capacity at high flowrates to achieve maximum productivity (mg/mL/min).

SUMMARY OF THE INVENTION

One aspect of the invention is to provide a separation matrix providing rapid biomacromolecule separations with high selectivity. This is achieved with a matrix having a plurality of multimodal ligands covalently coupled to a support, where the support is a membrane comprising non-woven polymer fibers and where the ligands are capable of interacting with a target biomacromolecule.

A second aspect of the invention is to provide a method of rapid flow-through separations with high selectivity. This is achieved with a method of recovering a purified biomacromolecule from a load fluid including one or more impurities, comprising the steps of:

a) passing the load fluid through the separation matrix as discussed above; and b) recovering the purified biomacromolecule in the matrix effluent during the load cycle and optionally during any essentially isocratic wash.

A third aspect of the invention is to provide a method of rapid bind-elute separations with high selectivity. This is achieved with a method of recovering a purified biomacromolecule from a load fluid including one or more impurities, comprising the steps of:

a) passing the load fluid through the separation matrix as discussed above;
b) optionally passing a wash fluid through the separation matrix;
c) passing an eluent through the separation matrix;
d) recovering the purified biomacromolecule in the eluent after passage through the separation matrix; and
e) passing a regeneration fluid through the separation matrix.

Further suitable embodiments of the invention are described in the dependent claims.

DRAWINGS

DEFINITIONS

Figure 1:
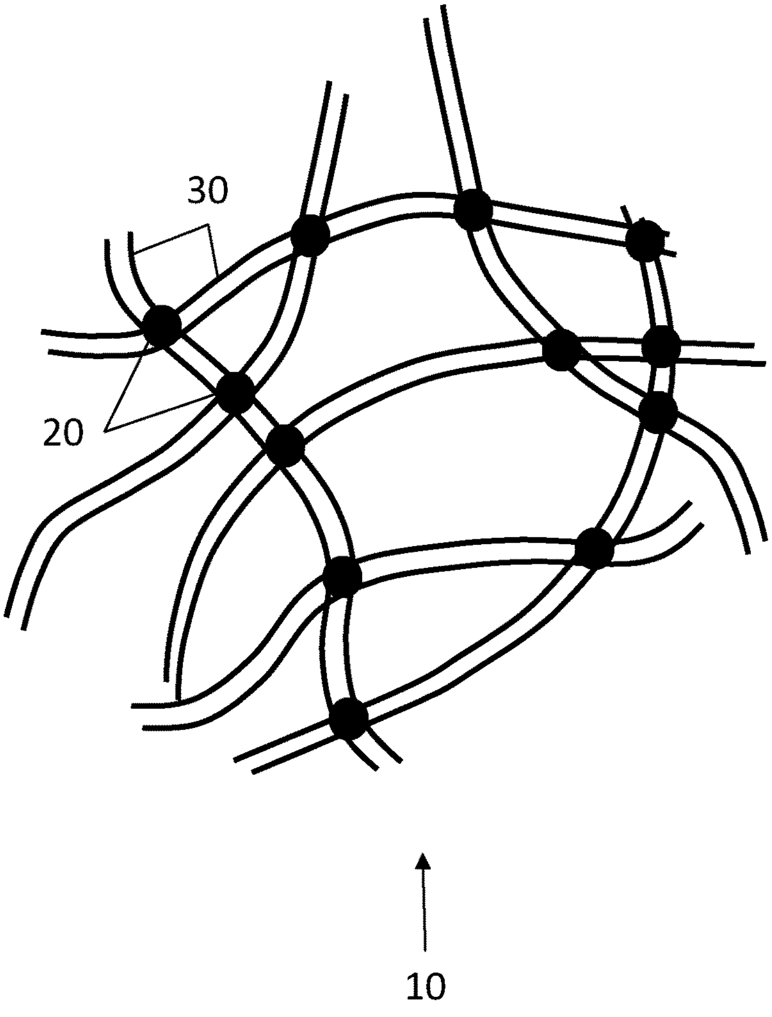
FIG. 1 shows a schematic drawing of a chromatography medium of the invention.

The terms “antibody” and “immunoglobulin” are used interchangeably herein, and are understood to include also fragments of antibodies, fusion proteins comprising antibodies or antibody fragments and conjugates comprising antibodies or antibody fragments.

The terms an “Fc-binding polypeptide” and “Fc-binding protein” mean a polypeptide or protein respectively, capable of binding to the crystallizable part (Fc) of an antibody and includes e.g. Protein A and Protein G, or any fragment or fusion protein thereof that has maintained said binding property.

The term “spacer” herein means an element connecting a ligand to a support.

As used herein, the terms “comprises,” “comprising,” “containing,” “having” and the like can have the meaning ascribed to them in U.S. Patent law and can mean “includes,” “including,” and the like; “consisting essentially of” or “consists essentially” likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

DETAILED DESCRIPTION OF EMBODIMENTS

In one aspect, the present invention discloses a separation matrix comprising a plurality of multimodal ligands covalently coupled to a support. The support is a membrane comprising nonwoven polymer fibers, which can suitably be polymer nanofibers, e.g. cellulose nanofibers, and the multimodal ligands are capable of interacting with a target biomacromolecule, e.g. a protein, a protein conjugate, a nucleic acid, a virus particle or a virus-like particle. For further details about the support and the (nano)fibers, see below. The ligands are chemical moieties which are covalently bound to the support, either directly to the fiber surfaces or to a polymer grafted on the fiber surfaces, as discussed below. The ligands can further be covalently bound to the fiber surfaces or the grafted polymer via spacers. Spacers are well known in the art of separation matrices and can typically be organic groups with one or more carbon atoms, e.g. 1-10 carbon atoms, linking a ligand to the fiber surface or polymer. The ligands are multimodal, which means that they are capable of interacting with the target biomacromolecule via at least two types of interactions, leading to a higher degree of selectivity than what can be achieved with a single type of interaction. Thus, the ligands can have at least two of the following different functionalities: a positive charge, a negative charge, a hydrophobic group, an aromatic group capable of π-π interactions or cation—π interactions, a hydrogen bond donor, a hydrogen bond acceptor, an electron donor and an electron acceptor. Preferred combinations include positive charge+hydrophobic group, positive charge+aromatic group, negative charge+hydrophobic group, negative charge+aromatic group and negative charge+electron donor. The amount of ligands can suitably be such that the separation matrix has a ligand density of 100-2000 μmol ligands per g dry separation matrix. This provides a high binding capacity for the target biomolecule in combination with a high selectivity.

Ligands

In some embodiments, the multimodal ligands comprise multimodal anion exchange ligands, i.e. ligands with a positive charge and a hydrophobic and/or aromatic group. The multimodal anion exchange ligands may e.g. comprise ligands of structure $$R_1\text{-}L_1\text{-}N(R_3)\text{-}L_2\text{-}R_2,$$

coupled to the support via the nitrogen such that the tertiary amine nitrogen after coupling is a quaternary ammonium group, wherein:

$R_1$ is a five- or six-membered, substituted or non-substituted, aromatic or aliphatic ring structure, a hydroxyethyl group or a $C_1$-$C_4$ alkyl group;
$L_1$ is either a methylene group or a covalent bond;
$R_2$ is a five- or six-membered, substituted or non-substituted, aromatic or aliphatic ring structure;
$L_2$ is either a methylene group or a covalent bond;
$R_3$ is a methyl group.

The ligands may in particular comprise N-benzyl-N-methyl ethanol amine ligands coupled to the support via the nitrogen, where in this case $R_1$ is a hydroxyethyl group, $L_1$ is a covalent bond, $R_3$ is a methyl group, $L_2$ is a methylene group and $R_2$ is a non-substituted benzene ring. Alternatively, the ligands may comprise a) N,N-dimethylbenzylamine ($R_1$ a methyl group, $L_1$ a covalent bond, $R_3$ a methyl group, $L_2$ a methylene group and $R_2$ a non-substituted benzene ring), b) 2-(N-(cyclohexylmethyl)-N-methylamino) ethanol ($R_1$ a hydroxyethyl group, $L_1$ a covalent bond, $R_3$ a methyl group, $L_2$ a methylene group and $R_2$ a non-substituted cyclohexyl ring), c) 2-(N-(4-(trifluoromethyl)benzyl)-N-methylamino)ethanol ($R_1$ a hydroxyethyl group, $L_1$ a covalent bond, $R_3$ a methyl group, $L_2$ a methylene group and $R_2$ a p-trifluoromethylphenyl group), d) 2-(N-(3,4,5-(trimethoxy)benzyl)-N-methylamino)ethanol ($R_1$ a hydroxyethyl group, $L_1$ a covalent bond, $R_3$ a methyl group, $L_2$ a methylene group and $R_2$ a trimethoxyphenyl group) or e) N-benzyl-N-methyl(thiophen-2-yl)methanamine ($R_1$ a thiophene ring, $L_1$ a methylene group, $R_3$ a methyl group, $L_2$ a methylene group and $R_2$ a non-substituted benzene ring). See also US20150299248, hereby incorporated by reference in its entirety.

Alternatively, the multimodal anion exchange ligands may comprise ligands of structure $N(R_6,R_7)—R_8\text{-}L_3\text{-}Ar$ coupled to the support via the nitrogen N, wherein:

$R_6$ and $R_7$ are independently hydrogen, a 1-6 carbon alkyl or a hydroxyethyl;

$R_8$ is a 1-6 carbon alkyl or cycloalkyl or an ethoxy;

$L_3$ is a covalent bond, $NR_9$, O or S, wherein $R_9$ is a 1-6 carbon alkyl;

Ar is a substituted or non-substituted aromatic or heteroaromatic ring.

Examples of such ligands are e.g. N-phenyl-ethylenediamine, 2-phenoxyethylamine, N,N-dimethyl-2-phenoxy-ethan-1-amine, N,N-dimethyl-3-phenoxy-propan-1-amine, N,N-dimethyl-2-(2-phenoxyethoxy)ethan-1-amine, 2-(methyl(2-phenoxyethyl)amino)ethan-1-ol, 2-(3,5-dimethylphenoxy)-N,N-dimethylethan-1-amine, 2-([1,1'-biphenyl]-4-yloxy)-N,N-dimethylethan-1-amine, N,N-dimethyl-2-(p-tolyloxy)ethan-1-amine, 2-(4-ethylphenoxy)-N,N-dimethylethan-1-amine, 2-(4-isopropylphenoxy)-N,N-dimethylethan-1-amine, 2-(4-fluorophenoxy)-N,N-dimethylethan-1-amine, 2-(2,5-difluorophenoxy)-N,N-dimethylethan-1-amine, 2-(3-fluorophenoxy)-N,N-dimethylethan-1-amine, 2-(3,5-difluorophenoxy)-N,N-dimethylethan-1-amine, 2-(3,5-difluorophenoxy)-N,N-dimethylpropan-1-amine, 2-(3,4-difluorophenoxy)-N,N-dimethylethan-1-amine, 2-(3,4,5-trifluorophenoxy)-N,N-dimethylethan-1-amine, 2-(4-(tert-butyl)phenoxy)-N,N-dimethylethan-1-amine, N,N-dimethyl-2-(naphtalen-1-yloxy)ethan-1-amine, N,N-dimethyl-2-(perfluorophenoxy)ethan-1-amine, N,N-dimethyl-2-(pyridin-4-yloxy)ethan-1-amine, N,N-dimethyl-2-(pyridin-3-yloxy)ethan-1-amine, 2-((2,6-dimethylpyridin-4-yl)oxy)-N,N-dimethylethan-1-amine, N,N-dimethyl-3-(pyridin-4-yloxy)propan-1-amine, N,N-dimethyl-3-phenoxycyclobutan-1-amine, N,N-dimethyl-3-phenoxycyclopentan-1-amine, and N,N-dimethyl-3-phenoxycyclohexan-1-amine. See also WO2019173731 and U.S. Pat. No. 9,669,402, hereby incorporated by reference in their entireties.

In certain embodiments, the multimodal ligands comprise multimodal cation exchange ligands, i.e. ligands with a negative charge and a hydrophobic and/or aromatic group. The multimodal cation exchange ligands may e.g. comprise ligands of structure $S—R_4(COOH)—N(H)—C(O)—R_5$ coupled to the support via the sulfur, wherein:

$R_4$ is a $C_2$-$C_6$ alkylene group; and $R_5$ is a five- or six-membered, substituted or non-substituted, aromatic or aliphatic ring structure.

The ligands may in particular comprise ligands of structure

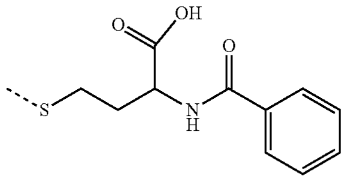

coupled to the support via the sulfur.

Alternatively, the multimodal cation exchange ligands may comprise copolymer chains comprising units derived from a) a first monomer of structure $CH_2$=$CH\text{-}L_4\text{-}X_1$, where $L_4$ is a covalent bond or an alkyl ether or hydroxyl substituted alkyl ether chain comprising 2-6 carbon atoms, and $X_1$ is a sulfonate or phosphonate group and b) a second non-charged vinyl amide monomer.

The copolymer chains can e.g. be vinyl sulfonate-co-N-vinyl pyrrolidone copolymer chains, where $L_4$ is a covalent bond, $X_1$ is a sulfonate and the vinyl amide is N-vinyl pyrrolidone.

Alternatively, the copolymer chains can be vinyl phosphonate-co-N-vinyl pyrrolidone copolymer chains ($X_1$ is a phosphonate) or vinyl sulfonate-co-N-vinyl caprolactam chains (the vinyl amide is N-vinyl caprolactam).

Alternatively, the multimodal cation exchange ligands may comprise ligands of structure $NH\text{-}Ph\text{-}(CH_2)_n—X_2—(CH_2)_m—COO^-$ coupled to the support via the nitrogen N, wherein:

Ph is a benzene ring, with the NH group in o-, m- or p-position;

n is 0, 1 or 2;

m is 1, 2, 3, 4 or 5;

$X_2$ is selected from a covalent bond, S, C(O)NH, NHC(O), $C(O)NHCH_2C(O)NH$ and $SO_2$.

Examples of such ligands are e.g. p-NH-Ph-$CH_2C(O)NHCH_2COO^-$, p-NH-Ph-$C(O)NHCH_2C(O)NH\ CH_2COO^-$, o-NH-Ph-$C(O)NHCH_2COO^-$, p-NH-Ph-$CH_2SCH_2COO^-$, o-NH-Ph-$CH_2SCH_2COO^-$, p-NH-Ph-$CH_2SO_2CH_2COO^-$, p-NH-Ph-$CH_2COO^-$ and p-NH-Ph-$(CH_2)_3COO^-$. See also US2015258539, hereby incorporated by reference in its entirety.

Further, the multimodal cation exchange ligands may comprise ligands of structure $R_9CH(NH2)COOH$ coupled to the support via the nitrogen N, wherein:

$R_9$ is an aromatic group or a $C_5$-$C_7$ nonionic aliphatic group.

Examples of such ligands are e.g. phenylalanine, tryptophan, leucine, isoleucine and norleucine. See also U.S. Pat. No. 8,530,698, hereby incorporated by reference in its entirety.

In some embodiments, the multimodal ligands comprise metal chelating ligands, i.e. ligands with at least two types of groups forming coordination bonds with metal ions, e.g. electron donor groups (such as tertiary amines) and negatively charged groups (such as carboxylate groups). The metal chelating ligands can in particular comprise ligands with at least three carboxylic groups and at least one tertiary amine, such as at least two tertiary amines. One example of such a ligand is a ligand of structure

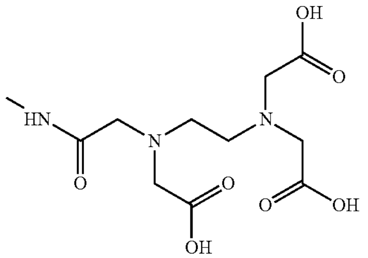 [SMILES: CNC(=O)CN(CCN(CC(=O)O)CC(=O)O)CC(=O)O]

coupled to the support via the amide nitrogen. Another example is a ligand of structure

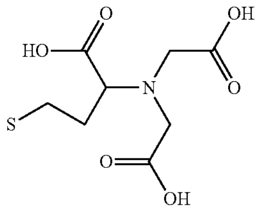 [SMILES: O=C(O)CN(CC(=O)O)C(CCS)C(=O)O]

coupled to the support via the sulfur.

Yet further examples include ligands of structures: $NH_2(CH_2)_4CH(COOH)N(CH_2COOH)_2$, coupled to the support via the terminal nitrogen, and $HOOCCH_2NHCH_2CH_2CN(CH_2COOH)_2$, coupled to the support via the secondary amine nitrogen.

Separation matrices with metal chelating ligands may further comprise transition metal ions, such as e.g. $Ni^{2+}$ ions, $Co^{2+}$ or $Cu^{2+}$ ions bound to the ligands. These ions can bind proteins, in particular proteins with polyhistidine tags, for selective separation of these proteins from complex mixtures.

Polymer Nanofibers

The separation matrices of the present invention are formed from polymeric fiber/nanofiber supports. Each support is formed of one or more polymer fiber/nanofibers.

The polymer fibers/nanofibers are typically electrospun polymer nanofibers. Such electrospun polymer nanofibers are well known to the person skilled in the art and optimized conditions for their production can be found in, for example, O. Hardick, et al., J. Mater. Sci. 46 (2011) 3890, the entirety of which is incorporated herein by reference. The processes of the present invention typically comprise an initial step of electrospinning a polymer to produce one or more polymer nanofibers. This may involve electrospinning a polymer to produce one or more non-woven sheets or layers, each comprising one or more polymer nanofibers. Suitably, the sheet(s) or layer(s) (10) each comprise a plurality of nanofiber-nanofiber fusion points (20) as illustrated in FIG. 1. The intralayer fusion points between the individual nanofibers (30) at their junctions provide mechanical stability to the sheets/layers and decrease the risk of nanofiber shedding into liquids during use. The fusion points can suitably be achieved by controlling the temperatures during the electrospinning process such that the deposited nanofibers contact each other before solidification. It can be particularly advantageous to electrospin a polymer solution, in which case the fibers formed solidify by evaporation of a solvent, providing sufficient time for formation of intralayer fusion points before solidification.

Polymer fibers/nanofibers for use in the present invention typically have mean diameters from 10 nm to 1000 nm. For some applications, polymer nanofibers having mean diameters from 200 nm to 800 nm are appropriate. Polymer fibers/nanofibers having mean diameters from 200 nm to 400 nm may be appropriate for certain applications. The length of polymer fibers/nanofibers for use in the present invention is not particularly limited. Thus, conventional electrospinning processes can produce polymer nanofibers many hundreds of meters or even kilometers in length. Typically, though, the one or more polymer fibers/nanofibers have a length up to 10 km, preferably from 10 m to 10 km. The polymer fibers/nanofibers can suitably be monofilament nanofibers and may e.g. have a circular, ellipsoidal or essentially circular/ellipsoidal cross section.

The one or more polymer fibers/nanofibers are provided in the form of one or more non-woven sheets, each comprising one or more polymer fibers/nanofibers. Thus, the support is typically formed of one or more non-woven sheets, each comprising one or more polymer fibers/nanofibers. A non-woven sheet comprising one or more polymer fibers/nanofibers is a mat of the one or more polymer nanofibers with each nanofiber oriented essentially randomly, i.e. it has not been fabricated so that the nanofiber or nanofibers adopt a particular pattern. Non-woven sheets comprising polymer fiber/nanofibers are typically provided by known methods, such as that disclosed in O. Hardick, et al., J. Mater. Sci. 46 (2011) 3890. Non-woven sheets may, in certain circumstances, consist of a single polymer nanofiber. Alternatively, non-woven sheets may comprise two or more polymer nanofibers, for example 2, 3, 4, 5, 6, 7, 8, 9 or 10 polymer nanofibers.

Non-woven sheets typically have area densities from 1 to 40 $g/m^2$, preferably from 5 to 25 $g/m^2$, in some circumstances from 1 to 20 or 5 to 15 $g/m^2$.

Non-woven sheets typically have a thickness from 5 to 120 μm, preferably from 10 to 100 μm, in some circumstances from 50 to 90 μm, in other circumstances from 5 to 40, 10 to 30 or 15 to 25 μm.

The polymer used to produce the fibers/nanofibers used in the processes of the present invention is not particularly limited, provided the polymer is suitable for use in chromatography applications. Thus, typically, the polymer is a polymer suitable for use as a chromatography medium, i.e. an adsorbent, in a chromatography method. Suitable polymers include polyamides such as nylon, polyacrylic acid, polymethacrylic acid, polyacrylonitrile, polystyrene, polysulfones e.g. polyethersulfone (PES), polycaprolactone, collagen, chitosan, polyethylene oxide, agarose, agarose acetate, cellulose, cellulose acetate, and combinations thereof. Polyethersulfone (PES), cellulose, cellulose acetate, and combinations thereof are preferred. In some cases, cellulose, cellulose acetate, and combinations thereof are preferred.

In some embodiments, the substrate comprises one or more fibers/nanofibers formed from different polymers. Thus, in this embodiment, the substrate comprises one or more different polymers. Typical polymers are as defined above.

Typically, the present invention involves a functionalized cellulose separation matrix, prepared from a support formed of one or more cellulose acetate fibers/nanofibers. Preferably, the preparation comprises providing a substrate formed of one or more non-woven sheets or layers, each comprising one or more cellulose acetate nanofibers. Cellulose acetate is readily electrospun, typically from a solution of cellulose acetate in one or more organic solvents, and can readily be transformed into cellulose after electrospinning. Thus, preferably the support is formed of one or more non-woven sheets/layers, each comprising one or more electrospun cellulose acetate nanofibers.

Physical Modification of Fibers/Nanofibers

In certain preferred embodiments of the invention, provision of a substrate involves physical modification of the polymer nanofibers optionally in the non-woven sheets/layers, prior to the grafting step. Specifically, physical modification may involve heating and/or pressing the polymer nanofibers/non-woven sheets/layers, preferably heating and pressing the polymer nanofibers/non-woven sheets/layers. These steps improve the structural stability of the material. The pressing and heating conditions may also be varied to alter the thickness and/or porosity of the resultant material.

Use of multiple non-woven sheets of polymer nanofibers enables a thicker material to be prepared which has a greater capacity for adsorption (once grafted and functionalized). The provision of a support typically therefore comprises providing two or more non-woven sheets/layers stacked one on top of the other, each said sheet comprising one or more polymer nanofibers, and simultaneously heating and pressing the stack of sheets/layers to fuse points of contact between the nanofibers of adjacent sheets/layers, creating interlayer fusion points. In the case of a cellulose separation matrix, provision of a support typically comprises providing two or more non-woven sheets/layers stacked or folded over one on top of the other, each said sheet/layer comprising one or more cellulose acetate nanofibers, and simultaneously heating and pressing the stack of sheets/layers to fuse points of contact between the nanofibers of adjacent sheets. The functionalized separation matrix can thus be a stack of a plurality of non-woven polymeric nanofiber layers, with a plurality of interlayer nanofiber-nanofiber fusion points, which bond at least two of the layers to each other.

Preferred processing conditions for pressing and heating of polymer nanofibers/nonwoven sheets can be found in US 20160288089 and WO 2015/052465, the entireties of which are incorporated herein by reference.

Grafting Nanofiber Substrate

The preparation of the matrices of the present invention may involve a grafting step which typically involves grafting one or more neutral polymer chains from the support provided as above.

Grafting one or more neutral polymer chains from a substrate typically comprises growing one or more polymer chains from one or more functional groups present on the substrate, optionally in the presence of one or more catalysts. Thus, typically, the substrate comprises one or more functional groups, preferably one or more functional groups from which a polymer chain may be grown. Growing a polymer chain from the one or more functional groups means building up a polymer at the one or more functional groups from individual monomer building blocks. The grafting step typically therefore involves growing polymer chains directly from the substrate, rather than bonding preformed polymer chains to the substrate. Bonding a preformed polymer like e.g. polyglycidol is however also an alternative. Thus, as the polymerization progresses, individual monomers are added to the ends of growing polymer chains that are anchored distally to the substrate. The polymer coating will then comprise polymer molecules which are single-point covalently tethered to the substrate. The polymer molecules may be linear or branched and even hyper-branched, in which case >50% of the monomer residues are either branch points or terminal monomers. Growth of the polymer chains directly from the substrate enables control over the structure of the polymer coating, particularly using a polymerization strategy whereby the polymers all grow simultaneously at a uniform rate. This enables formation of a dense and well-defined polymer coating layer. Thus, when the substrate is one or more layers of polymeric nanofibers fused together at their junctions, a well-defined thin coating will be formed—covering the core nanofibers and the fusion points between individual nanofibers. The coating may be a conformal coating, i.e. following the contours of the nanofibers and the fusion points. The thickness of the coating may e.g. be such that the coated nanofibers have an average diameter of 100-1000 nm, such as 100-700 nm or 200-700 nm. The average diameters of the non-coated nanofibers may then e.g. be 100-800 nm, such as 100-600 nm. The average pore size of the layer(s) may e.g. be 200-800 nm and the pore volume fraction may e.g. be 50-90%, such as 60-80%. The average pore size and the average fiber diameters can be calculated from SEM images of the layers and the pore volume fraction can be calculated from the total volume of a layer or substrate (the thickness multiplied by the cross-sectional area) and the specific gravity of the nanofibers. A specific example of a pore volume calculation of a representative multilayer cellulose acetate nanofiber disc is: Disc diameter 32 mm and disc thickness 0.44 mm gives a total volume of 0.354 $cm^3$. The dry weight of the disc is 0.165 g, which with a cellulose acetate specific gravity of 1.31 $g/cm^3$ gives a cellulose acetate volume of 0.126 $cm^3$. The pore volume fraction is thus (0.354-0.126)/0.354=64%.

The pore structure of the layers is important for the performance in that a delicate balance between high dynamic binding capacity (large accessible surface and short diffusion paths) and low back pressures (large pores and high pore volume fractions) needs to be met. The grafted nanofiber layers are uniquely suited for meeting this balance with their small fiber diameters and high pore volume fractions. Particularly good combinations are achieved when the layers have the following pore sizes, as obtained from capillary flow porometry with a perfluoropolyether wetting liquid: bubblepoint pore size—0.9-1.2 μm, such as 1.0-1.2 μm; smallest pore size—0.2-0.4 μm and/or mean flow pore (MFP) pore size 0.3-0.5 μm. The measurements should be performed as detailed below in Analytical Methods.

Figure 2:
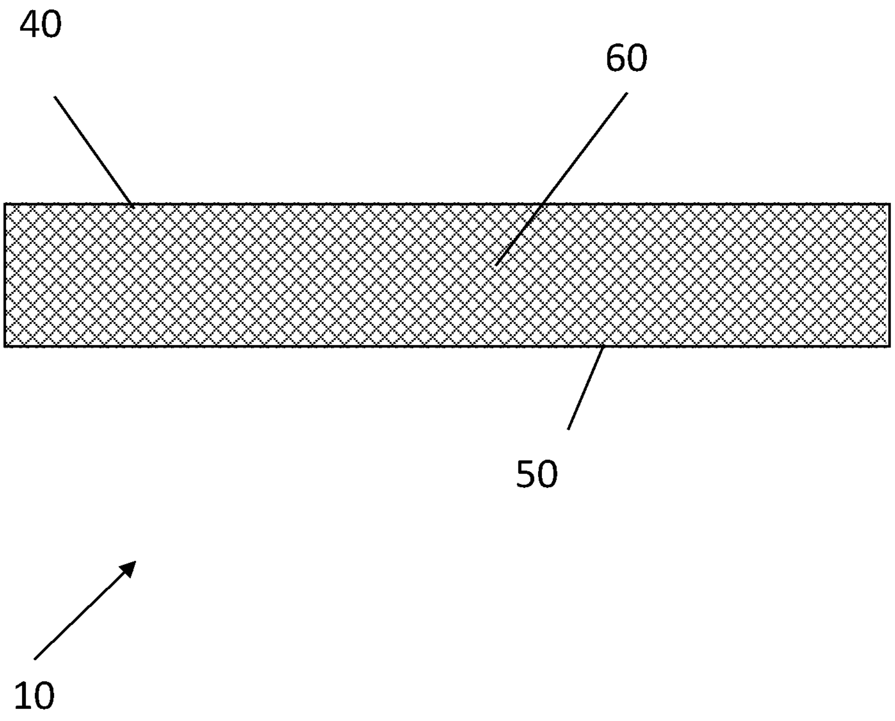
FIG. 2 shows a schematic drawing of a chromatography medium of the invention.

For good flow properties, it is advantageous if the open pore structure of the support is retained after the grafting process. In this way, the separation matrix (10) will have a first side (40) and a second side (50) as depicted in FIG. 2, fluidically connected to each other through an open, and three-dimensionally connected, pore structure (60) formed by the interstices (interstitial volume) between the grafted polymeric nanofibers. This pore structure is preferably free from, or substantially free from, graft polymer or any homopolymer accidentally formed during the grafting process. This can be achieved by limiting the monomer amounts added during grafting and the absence of any polymer obstructing the pore structure can easily be checked by measuring the flow rate, and/or by observing the pore structure by electron microscopy. The graft polymerization process offers a unique possibility to introduce a functionalized polymer increasing the binding capacity, without obstructing the pore structure.

An advantage of the grafted layers of the invention, in particular compared to hydrogel-coated membranes, is that the back pressure is essentially independent of buffer conductivity and pH. This is due to the absence of dramatic swelling/shrinking phenomena and can be expressed such that when an aqueous buffer of pH 5-8 is passed through the functionalized separation matrix at 0.4 s residence time, the pressure drop over the functionalized matrix changes by less than 0.07 MPa per mm bed height (medium thickness) when the conductivity of the buffer is changed over an interval of 3-90 mS/cm (as measured at 22° C.). 3 mS/cm corresponds to a 20 mM acetate or Tris buffer, while 90 mS/cm corresponds to the same buffers with approximately 1 M NaCl added.

In the present invention, the grafting may comprise reacting a plurality of compounds of formula

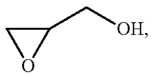

and/or its enantiomers or derivatives.

Most preferably, the grafting involves reacting the support having one or more functional groups from which polymers may be grown with a plurality of compounds of formula

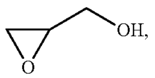

and/or its enantiomers, and/or its derivatives of formula (I) and/or enantiomers and/or diastereomers thereof:

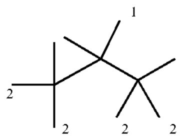

In embodiments where the support is formed from nanofibers formed from different polymers, each different kind of polymer nanofiber may be grafted with a different polymer in the grafting step. That could, for instance, result from different functional groups being present on the different polymer nanofibers. Alternatively, the same polymer may be grafted to each of the different kinds of polymer nanofiber in the support.

Typical functional groups include hydroxyl, amino and carboxyl groups. In the case where the support is formed of one or more cellulose or cellulose acetate nanofibers, the functional groups are typically hydroxyl groups.

In a particularly preferred embodiment, the functional groups are hydroxyl groups. In this particularly preferred embodiment, the grafting is typically carried out under conditions which additionally, in the same step, deprotect the hydroxyl groups on the substrate.

Deprotection of functional groups is typically effected so that the functional groups can have one or more polymer chains grown from them. For instance, when the separation matrix is a cellulose separation matrix, typically a cellulose acetate support is provided and, prior to the grafting step, the cellulose acetate is treated to convert it to cellulose. This involves the deprotection of acetylated hydroxyl groups to give hydroxyl groups. Conversion of cellulose acetate to cellulose is typically effected using aqueous alkali, preferably NaOH in water:ethanol, more preferably water:ethanol 2:1, for a period of greater than 12 hrs, for example from 12 to 36 hours. Depending on the conditions, the conversion (saponification) may be complete or partial, resulting in a certain content of residual acetate groups. Complete conversion is preferable but residual acetate contents of up to about 5 or 10 μmol per g dry support can be tolerated.

Alternatively, when the chromatography medium is a cellulose separation matrix, a cellulose acetate support is provided and treated in the grafting step (ii) under conditions in which both the cellulose acetate is converted to cellulose, and the cellulose subsequently reacts with a plurality of compounds of formula

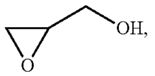

and/or its enantiomers, and/or its derivatives of formula (I) and/or enantiomers and/or diastereomers thereof to generate the grafted polymer chains. In such embodiments, the grafting step (ii) is typically effected in the presence of aqueous alkali, preferably NaOH or KOH, more preferably KOH, in water or water:ethanol, preferably in water, for a period of 4-6 hours.

When the separation matrix is a cellulose separation matrix, the matrix is typically prepared by:

(i) providing a support formed of one or more cellulose acetate nanofibers, treating the cellulose acetate to convert it to cellulose,
(ii) grafting one or more neutral polymer chains from the resultant cellulose support, and
(iii) contacting the grafted product with a reagent which functionalizes the product of step (ii) as a separation matrix.

Alternatively, the matrix can be prepared by:

(i) providing a support formed of one or more cellulose acetate nanofibers,
(ii) subjecting the support to conditions under which both the cellulose acetate is converted to cellulose and, subsequently, one or more neutral polymer chains are grafted onto the resultant cellulose support, and
(iii) contacting the grafted product with a reagent which functionalizes the product of step (ii) as a separation matrix.

Methods for increasing the number and/or density of functional groups on the substrate will be known to the skilled person.

When the one or more functional groups are introduced to the support, the support is treated between steps (i) and (ii) in a further step (i-a) of modifying a functional group present on the support to introduce a functional group from which one or more polymer chains may be grown followed by the step (ii) of growing polymer chains from the thus-modified support.

In embodiments involving glycidol polymerization, the support is typically treated between steps (i) and (ii) to deprotect any functional groups on the support.

The one or more polymer chains grafted to the support are suitably neutral. The polymer chains do not contain any groups that would be considered charged groups by a person skilled in the art, e.g. the sort of charged groups discussed below. Typically, the polymer chains grafted to the substrate in step (ii) do not contain any charged groups as defined herein.

Neutrality of a polymer can be assessed by whether the polymer contains any groups which would be ionizable, i.e. protonated or deprotonated, at essentially neutral pH, e.g. pH 6-8, typically pH 6.5-7.5, usually pH 6.75-7.25, or about pH 7. Typically, a neutral polymer contains substantially no acidic or basic centers, i.e. substantially no functional groups that are protonated or deprotonated at pH 6-8, typically pH 6.5-7.5, usually pH 6.75-7.25, or about pH 7. This can be determined by a skilled person by assays typical in the art. Typical procedures for the assessment of acidity and basicity, along with the theoretical aspects thereof are discussed in "Acidity and basicity of solids: Theory, assessment and utility" Editors J. Fraisard and L. Petrakis, NATO ASI Series C, volume 444, Kluwer Academic Publishers, Dordrecht, Boston and London, 1994, especially pp. 513, the entirety of which is incorporated herein by reference. As used here, substantially means fewer than 1 mol %, preferably fewer than 0.1 mol %, even more preferably fewer than 0.01 mol %, or even fewer than 0.001 mol %.

As mentioned above, the grafting step (ii) may involve reacting the substrate having one or more functional groups from which polymers may be grown with a plurality of compounds of formula

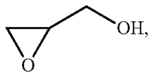

and/or its enantiomers.

Glycidol polymerization is a technique known to the person skilled in the art. Glycidol polymerization does not typically require the presence of a catalyst. However, the polymerization may optionally be carried out in the presence of one or more appropriate catalysts. In such embodiments, typically a chemical or biological catalyst is used. Glycidol polymerization is typically carried out in an aqueous environment under mildly alkaline conditions. Typically, glycidol polymerization is carried out at room temperature for greater than around 5 hrs, for instance around 16 hrs. Following glycidol polymerization, typically the grafted product is washed in water followed by mild acid.

Glycidol polymerization involves polymerizing glycidol and/or a glycidol derivative from one or more functional groups as defined herein present on the substrate. Typically, those functional groups are hydroxyl groups. Thus, typically, step (ii) comprises reacting a plurality of compounds of formula

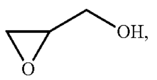

and its enantiomers, and/or its derivatives and/or enantiomers and/or diastereomers thereof, with one or more hydroxyl groups present on the nanofiber substrate.

Preferably, step (ii) comprises reacting a plurality of compounds of formula

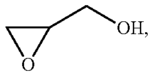

and its enantiomers with one or more hydroxyl groups present on the nanofiber substrate.

Glycidol polymerization inevitably results in branching of the polymer chain, yielding a "bush" structure. Thus, typically, one or more of the polymer chains is branched and may well be hyperbranched as discussed above. The different types of monomer residues in a glycidol polymer are: glycerol triether (branch point), 1,2-glycerol diether (linear) and 1- or 2-glycerol monoether (terminal). In many cases the triether and monoether residues dominate, producing a hyperbranched polymer.

In a second aspect, the invention discloses a method of recovering a purified biomacromolecule from a load fluid including one or more impurities, comprising the steps of:

a) passing the load fluid through the separation matrix as discussed above; and
b) recovering the purified biomacromolecule in the matrix effluent during the load cycle and optionally during any essentially isocratic wash.

This flowthrough method allows for rapid removal of adsorbing contaminants from a non-binding or very weakly binding biomacromolecule. If the amount of contaminants is low (e.g. after a previous affinity chromatography step), large amounts of biomacromolecule can be purified without any capacity issues. A typical example is the removal of aggregates and/or residual host cell proteins from immunoglobulins (e.g. monoclonal antibodies) after a Protein A or Protein L affinity chromatography step, using a separation matrix with multimodal anion exchange ligands as discussed above. Advantageously, this affinity chromatography step can be performed on a separation matrix comprising a plurality of affinity ligands, such as Protein A or Protein L ligands, covalently coupled to a support membrane comprising nonwoven polymer (e.g. cellulose) fibers, e.g. Fibro™ PrismA (Cytiva).

In a third aspect, the invention discloses a method of recovering a purified biomacromolecule from a load fluid including one or more impurities, comprising the steps of:

a) passing the load fluid through the separation matrix as discussed above;
b) optionally passing a wash fluid through the separation matrix;
c) passing an eluent through the separation matrix;
d) recovering the purified biomacromolecule in the eluent after passage through the separation matrix; and
e) passing a regeneration fluid through the separation matrix.

This bind-elute method allows for high efficiency removal of adsorbing and/or non-adsorbing contaminants from a binding biomacromolecule, such as a target protein. A typical example is the removal of aggregates and/or residual host cell proteins from immunoglobulins (e.g. monoclonal antibodies) after a Protein A or Protein L affinity chromatography step, using a separation matrix with multimodal cation exchange ligands as discussed above. Advantageously, this affinity chromatography step can be performed on a separation matrix comprising a plurality of affinity ligands, such as Protein A or Protein L ligands, covalently coupled to a support membrane comprising nonwoven polymer (e.g. cellulose) fibers, e.g. Fibrom PrismA (Cytiva).

Another example is the purification of his-tagged proteins from cell culture supernatants or lysates on separation matrices with metal chelating ligands and a transition metal ion (e.g. $Ni^{2+}$) as discussed above.

The above separation matrices allow for very rapid separation cycles and it is advantageous if steps a)-e) are repeated several times, e.g. at least 10 times or at least 20 or 50 times. The cycle time for each step a)-e) sequence can then be less than 5 minutes, such as less than 3 minutes or less than 2 minutes, or 0.5-5 minutes or 1-3 minutes.

EXAMPLES

Example 1

A solution of cellulose acetate, with a relative molecular mass of 29,000 g/mol, was dissolved in common solvents prior to electrospinning to produce fibers with diameters ranging between 300-600 nm. Optimized conditions for nanofiber production can be found in, for example, O. Hardick, et al, J. Mater. Sci. 46 (2011) 3890, the entirety of which is incorporated herein by reference. Sheets of approximately 20 $g/m^2$ material were layered and subjected to a combined heating and pressure treatment.

Nanofiber materials were derivatized according the scheme outlined below:

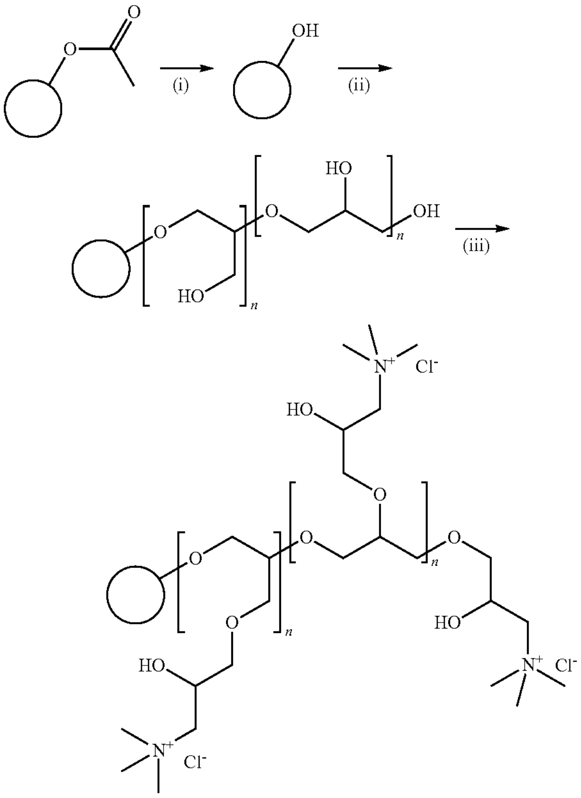

Step (i): Saponification of Cellulose Acetate (CA) to Regenerated Cellulose (RC)

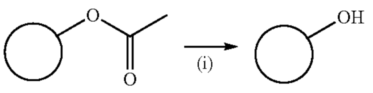

Cellulose acetate sheets (0.44*32 mm*150 mm) obtained in accordance with the method of Example 1 were placed into a large beaker containing 5 L of a 0.075 M sodium hydroxide solution in 2:1-water:ethanol. The reaction mixture was stirred at room temperature for 48 hours. The materials were then washed according to washing protocol A.

Washing Protocol A

The reaction media was replaced with an equal volume de-ionized water and circulated for 1 hour. The rinsing procedure was repeated once more. Finally, the materials were treated with an equal volume of aqueous ethanol (2:1—$H_2O$:EtOH) before being removed from the reaction vessel.

Step (ii): Glycidol Polymerization

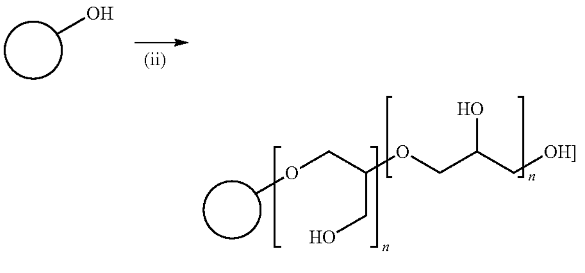

Materials from (i) were suspended in 1 L of 0.5 M NaOH. The reaction media was circulated for 15 minutes prior to the careful addition of varying amounts of glycidol (15 mL, 30 mL, 60 mL, 120 mL, 180 mL) in a single portion. The reaction media was circulated at room temperature for 16 hours and the material was subsequently washed according to washing protocol B.

Washing Protocol B

The reaction media was replaced with an equal volume of de-ionized water and circulated for 1 hour. After this time, the washing media was replaced with 0.01 M HCl which was circulated for 1 hour whereupon it was replaced with 0.001 M HCl and circulated for 1 hour. Finally, the media was replaced with 2:1 mixture of $H_2O$:EtOH which was circulated for 1 hour. The derivatized nanofibers were then removed from the reaction vessel.

Example 2—Glycidol Grafted, DVS Functionalized Material

Nanofiber materials were derivatized according the scheme outlined below:

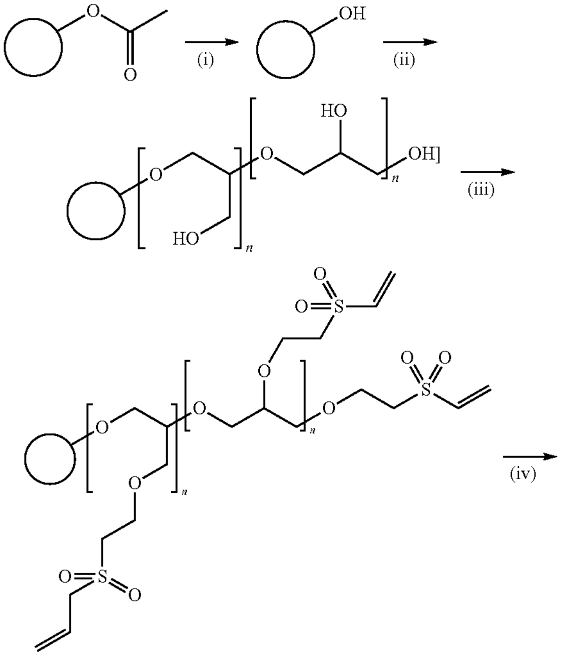

-continued

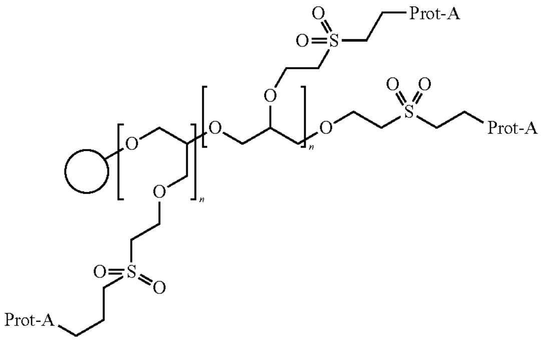

Step (i): Saponification of Cellulose Acetate (CA) to Regenerated Cellulose (RC)

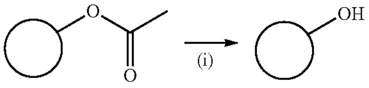

Cellulose acetate sheets (0.44*32 mm*150 mm) obtained in accordance with the method of Example 1 were placed into a large beaker containing 5 L of a 0.075 M sodium hydroxide solution in 2:1-water:ethanol. The reaction mixture was stirred at room temperature for 48 hours. The materials were then washed according to washing protocol A.

Step (ii): Glycidol Polymerization

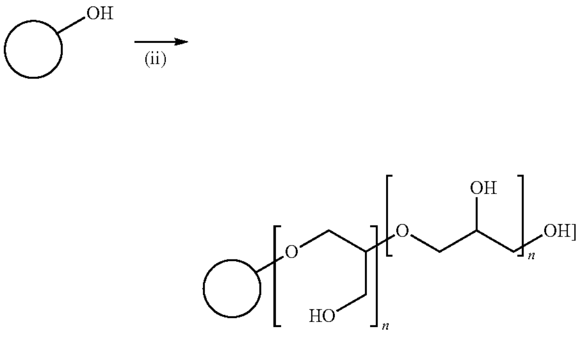

Materials from (i) were suspended in 1 L of 1 M NaOH. The reaction media was circulated for 15 minutes prior to the addition of 180 mL glycidol in a single portion. The reaction media was circulated at room temperature for 16 hours and the material was subsequently washed according to washing protocol B.

Step (iii): Divinylsulfone Derivatization

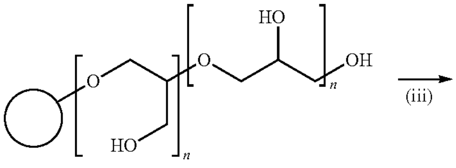

-continued

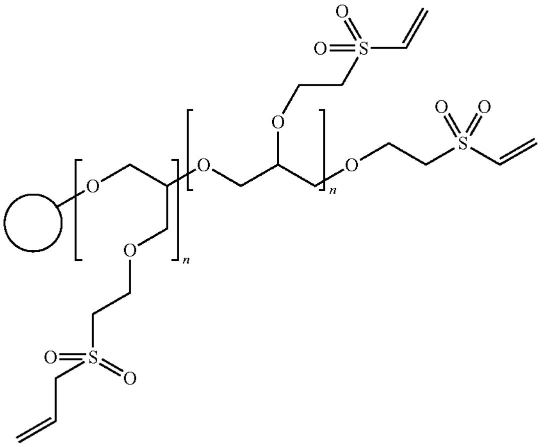

Materials from (ii) were suspended in a solution that consisted of 550 mL $H_2O$ with $K_2CO_3$ (48.8 g, 0.35 moles) dissolved within it and 150 mL acetonitrile. The reaction media was circulated for 15 minutes prior to the dropwise addition of divinylsulfone (100 ml, 0.86 moles), after which the reaction media was circulated for a further 1.5 hours. The materials were then washed according to washing protocol C.

Washing Protocol C

The reaction media was replaced with an equal volume of 1:1 mixture of warm (60° C.) de-ionized water:acetone which was circulated for 30 mins. The washing procedure was repeated twice more. Finally, the media was replaced with 2:1 mixture of $H_2O$:EtOH which was circulated for 1 hour. The derivatized nanofibers were then removed from the reaction vessel.

Example 3—Alternative Protocol for Glycidol Grafted, DVS Functionalized Material Nanofiber materials were derivatized according to the scheme outlined below:

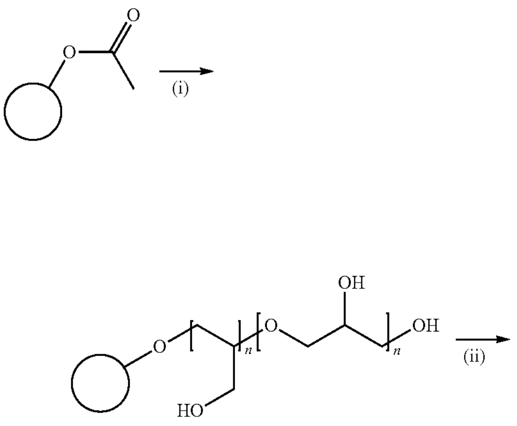

-continued

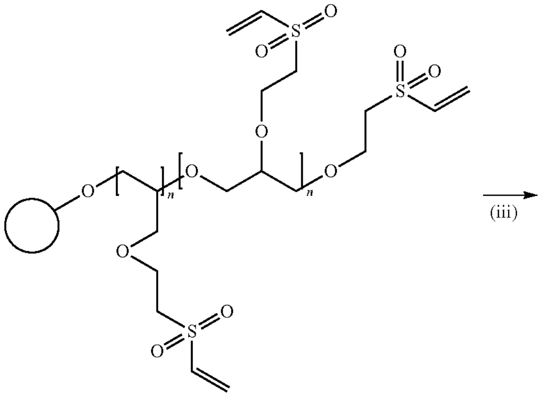

-continued

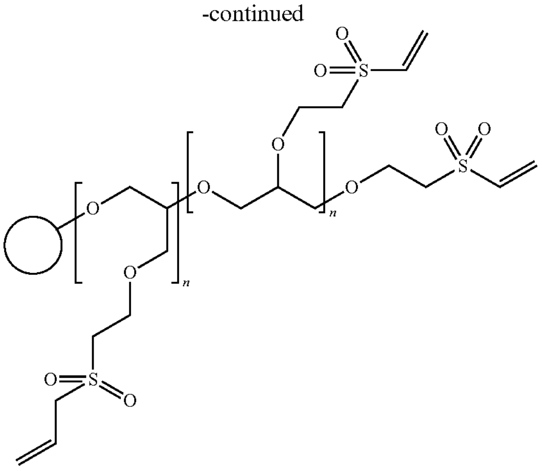

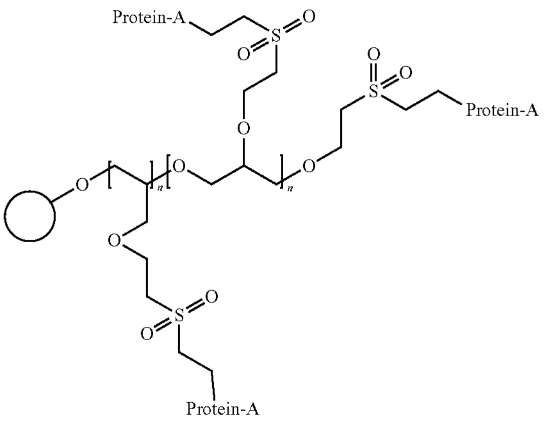

Step (i): Glycidol Polymerization and Saponification

The glycidol polymerization and saponification of CA nanofiber materials was effected by taking CA nanofiber material (0.11×80×50 mm) and suspending it in 1 L de-ionized water. The solvent was circulated for 3 hours before being refreshed with a further 1 L de-ionized water. After repeating this process 4 times, the nanofiber materials were suspended in 350 ml of 1 M KOH. The reaction media was circulated for 60 minutes prior to the careful addition of varying amounts of glycidol (100 ml) where 25% of the glycidol was added as a single portion and the remainder added dropwise over 90 minutes. The reaction media was circulated at room temperature for 4 hours and the material was subsequently washed according to washing protocol B.

Step (ii): Divinylsulfone Derivatization

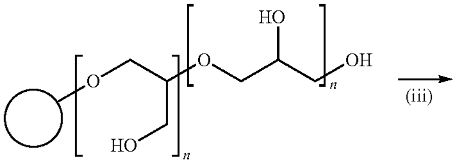

Materials from (i) were suspended in a solution that consisted of 550 mL $H_2O$ with $K_2CO_3$ (48.8 g, 0.35 moles) dissolved within it and 150 mL acetonitrile. The reaction media was circulated for 15 minutes prior to the dropwise addition of divinylsulfone (100 ml, 0.86 moles), after which the reaction media was circulated for a further 1.5 hours. The materials were then washed according to washing protocol C.

Example 4 Multimodal Anion Exchange Matrix with N-Benzyl-N-Methyl Ethanol Amine Ligands Step1:

50 cellulose acetate discs (32 mm diameter, 0.9 mm thickness) were washed with distilled water (4×600 ml). The wash solution was removed and replaced with 350 ml 0.5M KOH solution. The discs were treated with the KOH solution for 10 mins with stirring, before the addition of 100 ml Glycidol. The reaction media was stirred vigorously over the discs for 2 hours. After this time, the supernatant liquid was removed and the discs washed with distilled water (4×600 ml) to give a clean glycidol-grafted cellulose intermediate that was used without further modification for the next step.

Step2:

25 discs were taken from step 1 and treated with 300 ml 1M KOH. After the discs were stirred for 10 minutes, 30 ml allylglycidyl ether was added in a single portion. The resultant mixture was stirred vigorously for 16 hours. After this time, the supernatant was decanted and the discs washed with distilled $H_2O$ (4×600 ml). The clean allylated intermediate was used without further modification for the next step.

Step3:

25 discs were taken from step 2 and suspended in 500 ml $H_2O$ which contained 37.5 g $Na_2CO_3$ and 150 ml acetonitrile. The mixture was stirred vigorously while 100 ml divinyl sulfone was added dropwise over 60 minutes. The reaction mixture was then stirred vigorously for 16 hours. After this time, the supernatant liquid was decanted and the discs washed with 600 ml acetone:$H_2O$ (1:1) 3 times and with distilled $H_2O$ (1×600 ml). The clean intermediate was used for the next step without further modification.

Step4:

25 discs from step 3 were suspended in 500 ml $H_2O$: acetonitrile (1:3) solution which had 12.5 g N-bromosuccinimide dissolved in it. The mixture was stirred vigorously for 4 hours. After this time the supernatant liquid was decanted, and the discs were washed with copious amounts of distilled water (6×600 ml). The clean intermediate was used for the next step without further modification.

Step5:

18 g N-benzyl-N-methyl ethanol amine was suspended in 30 ml $H_2O$ and to this mixture was added 6 ml acetone. The pH of the solution was modified to pH15 with 5N NaOH. Meanwhile 25 discs from step 4 were placed, individually, in the wells of 6-well plates. To each disc was added 2.5 ml of the N-benzyl-N-methyl ethanol amine solution. The plates were gently agitated on an orbital shaker for 16 hours. After this time the reaction mixture was removed and each disc washed with distilled water (5×10 ml) to give the final product as white fibrous disc.

Discs were placed in a syringe filter devices and a monoclonal IgG antibody eluate from a MabSelect™ PrismA column (Cytiva, Sweden), containing 160 ppm host cell proteins (HCP) was passed through the discs, with a residence time of 1.2 s, and the flowthrough was collected. Aliquots of the eluate had previously been adjusted to different pH and conductivity levels. After passage of the discs, the antibody yield and residual HCP content in the flowthrough were as shown in Table 1:

TABLE 1

Results from flowthrough test with multimodal anion exchange ligands

| pH | Conductivity (mS/cm) | Yield (%) | HCP (ppm) |
|---|---|---|---|
| 6.5 | 18 | 97 | 111 |
| 7.0 | 10 | 99 | 54 |
| 7.5 | 3.5 | 99 | 26 |

Example 5 Multimodal Cation Exchange Matrix with N-Benzoylamido-Homocysteine Ligands Step1:

50 cellulose acetate discs (32 mm diameter, 0.9 mm thickness) were washed with distilled water (4×600 ml). The wash solution was removed and replaced with 350 ml 0.5M KOH solution. The discs were treated with the KOH solution for 10 mins with stirring, before the addition of 100 ml glycidol. The reaction media was stirred vigorously over the discs for 2 hours. After this time, the supernatant liquid was removed and the discs washed with distilled water (4×600 ml) to give a clean glycidol-grafted cellulose intermediate that was used without further modification for the next step.

Step2:

25 discs were taken from step 2 and suspended in 500 ml $H_2O$ which contained 37.5 g $Na_2CO_3$ and 150 ml acetonitrile. The mixture was stirred vigorously while 100 ml divinyl sulfone was added dropwise over 60 minutes. The reaction mixture was then stirred vigorously for 16 hours. After this time, the supernatant liquid was decanted and the discs washed with 600 ml acetone:$H_2O$ (1:1) 3 times and with distilled $H_2O$ (1×600 ml). The clean intermediate was used for the next step without further modification.

Step3:

The discs from step 2 were placed individually in the well of six well plates. Meanwhile, a solution of N-benzoyl-DL-homocysteine thiolactone was placed in a round bottomed flask containing 27 ml $H_2O$. 4 ml of a 50% w/v solution of NaOH was then added and the mixture heated to 40° C. for 2 hours with stirring. After this time the solution was cooled to ambient temperature. The pH of the solution was modified to 11.6 and 2.5 mls of the prepared solution was added directly to each disc, in the 6-well plate. The plates were incubated at 60° C. for 16 hours. After this time the supernatant was decanted and the discs washed with distilled water (5×10 ml) to give the final product as a white fibrous disc.

The prototypes were analysed with respect to dynamic IgG binding capacity (10% breakthrough) at 2.4 s residence time, with polyclonal IgG (Gammanorm, Octapharma) and a monoclonal IgG antibody. The capacity test was performed on single 25 mm punched discs placed in a membrane holder, with 0.47 mg/ml IgG in 50 mM NaAc buffer pH 5.0 with different NaCl concentrations loaded on the discs.

TABLE 2

Results from capacity test with multimodal cation exchange ligands

| Sample | Dynamic IgG capacity (mg/ml) | | |
|---|---|---|---|
| | No NaCl | 0.15M NaCl | 0.3M NaCl |
| Polyclonal IgG | 35.2 | 32.0 | 28.0 |
| Polyclonal IgG duplicate | 34.7 | 31.0 | 27.3 |
| mAb | 31 | 33 | 31 |

Example 6 Multimodal Cation Exchange Matrix with Poly(vinylsulfonate-co-N-vinylpyrrolidone) Ligands 32 mm diameter circular discs (thickness 0.9 mm) of glycidol grafted, DVS functionalized material prepared as in Example 2 were placed in a flask. The given amounts (see Table 3) of N-vinyl pyrrolidone (VP), vinylsulfonate sodium salt (30% aq solution) (VSA) and 2,2'-azobis(2-methylpropionamidine) dihydrochloride (ADBA) initiator were then added to each flask. The pH of the reaction mixture was set to 6-7 by adding diluted acetic acid. Water was then added to give a total solution weight of 2.45 g. The reaction was carried out in cell culture plates large enough to house the membranes which were 32 mm in diameter. The plates were placed on a heated shaking table and the table was set to 65° C. The grafting reaction continued for 16 h before washing the discs in the well plates. The material is stored in a 0.2M sodium acetate solution. The prototypes were analysed with respect to dynamic IgG binding capacity (10% breakthrough) at 2.4 s residence time. The capacity test was performed on single 25 mm punched discs placed in a membrane holder, with 0.5 mg/ml polyclonal IgG (Gammanorm, Octapharma) in 50 mM NaAc buffer pH 5.0 loaded on the discs.

TABLE 3

Results from IgG capacity test with multimodal cation exchange ligands

| Sample | VP ml | VSA ml | ADBA mg | IgG capacity mg/ml |
|---|---|---|---|---|
| 6a | 1.99 | 0.29 | 20 | 50 |
| 6b | 2.21 | 0.27 | 20 | 56 |
| 6c | 1.95 | 0.33 | 20 | 45 |

Example 7 Metal Chelating Matrix with EDTA Ligands

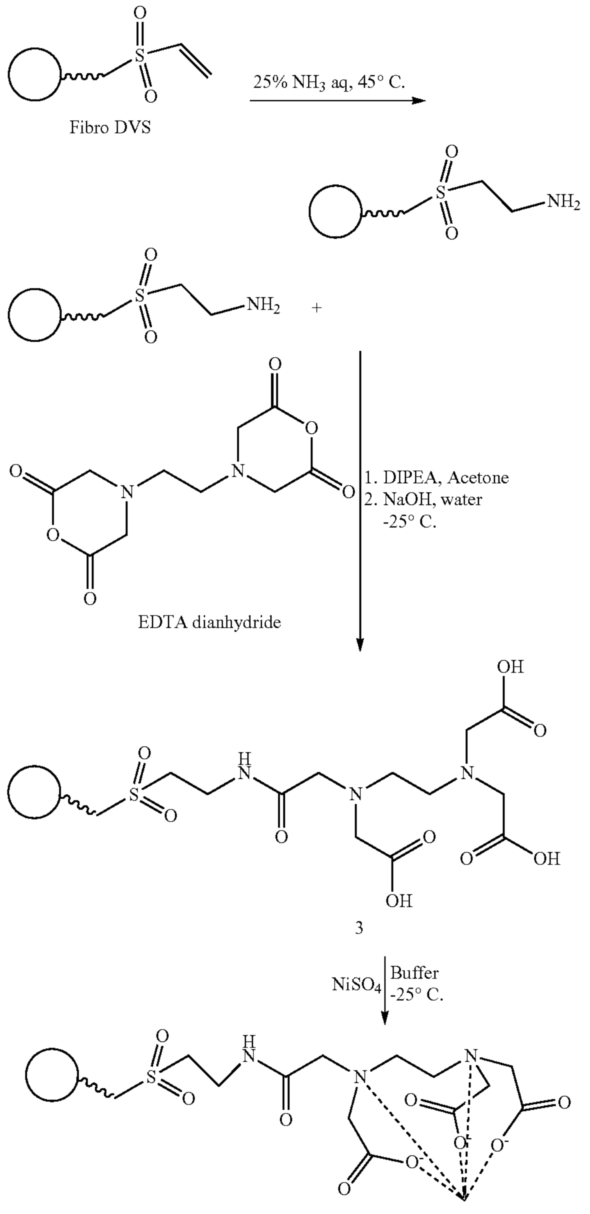

Fibro DVS
EDTA dianhydride
3

Final Product/IMAC Excel Fibro

1—Amination Step

Three membrane sheets (glycidol grafted, DVS functionalized material prepared as in Example 2) were wound around a net and then washed 3×700 ml water (20 minutes for each wash) in a beaker to remove the 20% ethanol storage solution. The well washed sheets around the net were transferred to a reaction reactor (500 ml) and 700 ml 25% ammonia was added and the reaction mixture was left over night at 45° C. The sheets around the net were transferred to a beaker and washed with 3×700 ml water (20 minutes for each wash).

2—Ligand Coupling Step

The three aminated sheets on the net from step 1 were washed with 6×1GV acetone in a beaker and then transferred into the reaction reactor and 700 ml acetone was added. To the reaction mixture, 2.9 g diisopropylethylamine (DIPEA) was added and the reaction was left for 5 minutes with stirring. 53 g EDTA dianhydride was added to the reaction mixture and the mixture was left overnight at 24-28° C. The sheets on the net were washed with 3×1GV acetone then 3×1GV water in a beaker and were then left with GV 1M NaOH for 1 hour to hydrolyze the excess of unreacted EDTA. The sheets on the net were washed in a beaker with 6×1GV water (20 minutes for each wash).

The sheets from the ligand coupling step were put in a plastic box and to the box 100 mm Ni SO4 solution was added for 15 min on a shaking table at ambient temperature. The sheet colour changed from white to turquoise/blue.

The sheets were left for characterization of Binding capacity.

Example 8 Metal Chelating Matrix with N,N-dicarboxymethyl-homocysteine Ligands

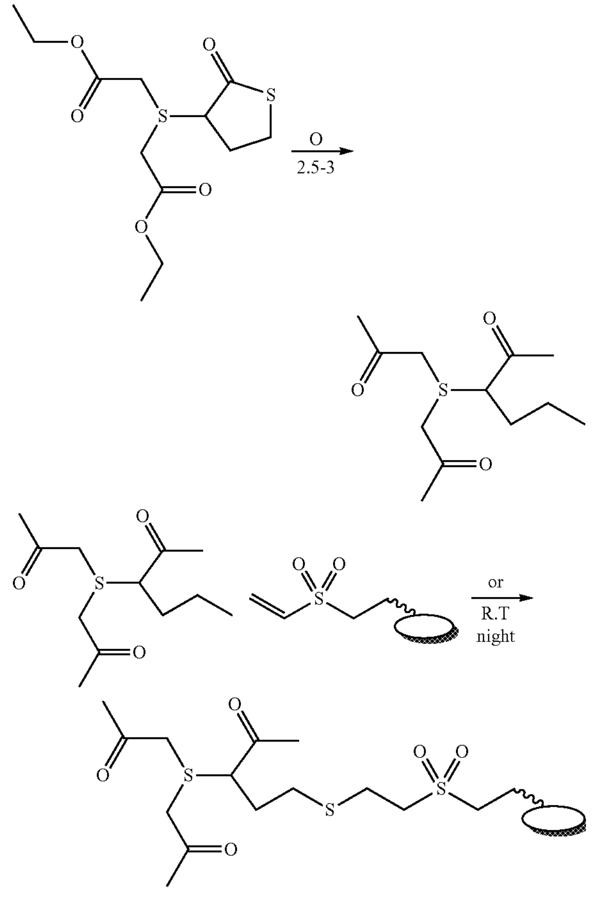

Hydrolysis of N,N-dicarboxymethyl Ethyl Ester Homocysteine Thiolactone

N,N-dicarboxymethyl ethyl ester homocysteine thiolactone 0.293 g was added to 6.5 mL 1.05 M NaOH in a 20 mL vial with a magnetic stirring bar and the hydrolysis progressed for 2.5 h at room temperature until all ligand had dissolved.

NaHCO$_3$ 1M Solution

To 25 mL distilled water 0.786 g sodium bicarbonate was added and stirred until all bicarbonate is dissolved Preparation of DVS Activated Discs 12 DVS activated discs, prepared as in Example 2, were placed in a holder and washed with 500 mL water 20 min 4 times to remove the 20% ethanol storage solution.

Immobilisation

The hydrolysed ligand solution was transferred to a beaker and the vial rinsed repeatedly with the bicarbonate solution to get as much as possible out of the vial. The pH is measured to 9.94. Half of the amount was poured into a beaker and pH adjusted to 11.8 using 50% NaOH. The remaining half was adjusted to pH 8.13 using conc. HCl. The washed DVS activated nanofiber discs were placed in 6-well plates using forceps.

A: 3 mL ligand solution, pH 11.8 in triplicates

B: 1.5 mL ligand solution+1.5 mL distilled water pH 11.8 in triplicates

C: 3 mL ligand solution, pH 8.1 in triplicates

D: 1.5 mL ligand solution+1.5 mL distilled water pH 8.1 in triplicates

The plates were wrapped in parafilm and placed on a shaker overnight at R.T and 90 rpm (17.2 h). The A and B discs immediately turned yellow whereas the pH 8.1 appeared unaffected All discs have had some shade of yellow, the pH 8.1 less than pH 11.8 The discs were removed from the wells and placed in a washing set-up using a plastic net in a 1 L beaker and washed with 6×800 mL water. pH of the solution is controlled to be ~7. The discs were placed in 6-wellplates and stored in water in the fridge.

The discs were loaded with nickel ions and evaluated a) with pure his-tagged Green Fluorescent Protein (GFP-His) (0.3 mg/ml), b) with an *E Coli* supernatant spiked with GFP-His and c) with a monoclonal antibody CHO cell culture supernatant spiked with GFP-His.

a) Pure GFP-His

A 10 ml sample of GFP-His solution was loaded on a disc placed in a syringe filter device. The experiment was performed at four different flow rates—1, 5, 10 and 20 ml/min. Table 4 shows the yield data for GFP-His eluted with imidazole.

TABLE 4

| GFP-His solution | | | | | |
|---|---|---|---|---|---|
| Flow rate (ml/min) | Area | Yield (mg) | Volume collected (ml) | Concentration (mg/ml) | Yield (% of loaded) |
| 1 | 2447 | 2.913 | 5.7 | 0.512 | 97 |
| 5 | 1762 | 2.098 | 6.0 | 0.349 | 70 |
| 10 | 1294 | 1.540 | 6.0 | 0.257 | 51 |
| 20 | 1052 | 1.253 | 6.0 | 0.208 | 40 |
| 1 (repeat) | 2342 | 2.788 | 6.0 | 0.465 | 93 |

b) *E coli* Supernatant Spiked with GFP-his

GFP-His was added to an *E coli* culture to give a GFP-His concentration of 100 μg/ml and the culture was ultracentrifuged for 20 min at 20 000 rpm. 50 ml was loaded on a disc in a syringe filter device at 10 ml/min flow rate and the GFP-His was eluted with imidazole buffer. The yield data are shown in Table 5.

TABLE 5

| *E Coli* supernatant spiked with GFP-His | | | | | |
|---|---|---|---|---|---|
| Flow rate (ml/min) | Area | Yield (mg) | Volume collected (ml) | Concentration (mg/ml) | Yield (% of loaded) |
| 10 | 4121 | 2.45 | 12 | 0.206 | 49 |

c) CHO Cell Culture Supernatant Spiked with GFP-his 500 ml CHO cell supernatant was ultracentrifuged 30 min at 20 000 rpm and spiked with 6.4 μg/ml GFP-His. 500 ml was then loaded on a disc in a syringe filter device at 10 ml/min flow rate and the GFP-His was eluted with imidazole buffer. The yield data are shown in Table 6.

TABLE 6

| CHO cell supernatant spiked with GFP-His | | | | | |
|---|---|---|---|---|---|
| Flow rate (ml/min) | Area | Yield (mg) | Volume collected (ml) | Concentration (mg/ml) | Yield (% of loaded) |
| 10 | 869 | 2.5 | 5.5 | 0.466 | 78 |

For the CHO cell culture experiment, the time and buffer consumption was:

Loading 500 ml at 10 ml/min-50 min

Wash 50 column volumes at 10 ml/min-5 min

Elution 15 column volumes at 5 ml/min-5 min

Total: 1 h, 65 ml

For comparison, with a packed bed column (HisTrap excel 5 ml, Cytiva) the results were:

Loading 500 ml at 5 ml/min-1 h 40 min

Wash 30 column volumes at 5 ml/min-30 min

Elution 10 column volumes at 5 ml/min-10 min

Total: 2 h 20 min, 200 ml

Analytical Methods

Determination of Dynamic Binding Capacity

Loading material was passed through a selected functionalized nanofiber disc contained within a holder on an ÄKTA Pure system (GE Healthcare). The material was loaded under a determined membrane volume per minute flowrate (mV/min) until the concentration after the holder outlet exceeded 10% of that loaded as determined by the UV flow cell. Accounting for dead volumes in the system and the holder device the total amount of protein loaded onto the disc at the 10% breakthrough was determined through analysis of the chromatogram in the Unicorn software (GE Healthcare). For anion exchange material the loading material was 1 mg/mL BSA in 10 mM Tris to pH 8. For cation exchange material the loading material was 1 mg/mL lysozyme in sodium acetate pH 4.7 mM.

Determination of Resistance to Flow

The pressure drop (ΔP) across the selected functionalized nanofiber material was determined using the ÄKTA Pure system (GE Healthcare). A buffer of 10 mM Tris (pH 8) was passed through a functionalized nanofiber disc contained within a holder. The flowrate at which the delta column pressure (ΔP) equaled 0.5 MPa was recorded.

Pore Size Measurement by Capillary Flow Analysis

The equipment used was a POROLUXet 100 porometer (I-FT GmbH, Berlin, Germany) and the methodology was as given in Table 7. Further details about the measurement principles can be found on the manufacturer's website http://www.ib-ft.com/measurement_principle.html The three pore sizes obtained from the measurements are smallest pore size, Mean Flow Pore (MIFP) size and bubble-point pore size (the largest pore size).

TABLE 7

| Capillary flow porometry | | |
|---|---|---|
| Porometer | Porometer model | Porolux 100 |
| | Porometer algorithm | Pressure Scan |
| | Measurable pore size | 90 nm-500 μm |
| | Pressure range | 0-7 bar |
| | Flow rate | up to 100 liters per minute |
| | First Bubble Point | Calculated-according to ASTMF 316-03 |
| Settings used | Calculated bubble point method used | First Flow |
| | Slope of pressure increase | 6.25 mbar/s (160 s/bar) |
| | Number of data points for wet curve | 50 |
| | Number of data points for dry curve | 25 |
| | Test Gas used | Nitrogen |
| | Fluid angle (°) | 0 (Default) |
| | Shape factor name | 1 (Default) |
| | Shape factor | 1 (Default) |
| | Temperature | 21° C. |
| Wetting fluid | Wetting Fluid | Porefil (Perfluoropolyether) |
| | Surface Tension | 16.45 ± 0.02 mN/m |
| | Tensiometer method for Wetting Fluid surface tension | 22° C., 40% RH |
| | Viscosity | 2.2 mPas |

The results from the capillary flow porometry, as well as estimates of the average nanofiber diameters from SEM images are shown in Table 8. It can be seen that the presence of the grafted polymer in the Glycidol Q and Glycidol DVS Protein A samples does not affect the overall structure of the fibrous networks, i.e. the graft coating has a conformal nature and is very thin. If overly large amounts of graft polymer are introduced, polymeric material may be formed between the nanofibers, negatively affecting the flowrate performance of the materials.

TABLE 8

| Pore sizes and nanofiber diameters | | | | |
|---|---|---|---|---|
| | Average fiber diameter (μm) | Smallest pore (μm) | MFP (μm) | Bubblepoint pore (μm) |
| No-graft Q | 0.65 | | | |
| Glycidol Q | 0.63 | | | |
| Glycidol DVS Protein A | 0.61 | 0.234 | 0.399 | 1.09 |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All patents and patent applications mentioned in the text are hereby incorporated by reference in their entireties as if individually incorporated.

The invention claimed is:

1. A separation matrix comprising a plurality of multimodal ligands covalently coupled to a support, wherein said support is a membrane comprising nonwoven polymer fibers and wherein said ligands comprise multimodal cation exchange ligands and are capable of interacting with a target biomacromolecule, wherein said multimodal cation exchange ligands comprise copolymer chains comprising units derived from a) a first monomer of structure $CH_2$═CH-$L_4$-$X_1$, where $L_4$ is a covalent bond or an alkyl ether or hydroxyl substituted alkyl ether chain comprising 2-6 carbon atoms, and $X_1$ is a sulfonate or phosphonate group and b) a second non-charged vinyl amide monomer.

2. The separation matrix of claim 1, wherein said polymer fibers are cellulosic fibers.

3. The separation matrix of claim 2, wherein said polymer fibers are cellulose fibers are saponified or partially saponified cellulose acetate fibers.

4. The separation matrix of claim 1, wherein said polymer fibers are partially fused together, forming a plurality of fiber-fiber fusion points.

5. The separation matrix of claim 1, wherein said membrane comprises a plurality of nonwoven fiber layers and wherein said layers are partially fused together.

6. The separation matrix of claim 1, wherein said polymer fibers have diameters of 100-800 nm.

7. The separation matrix of claim 1, further comprising a grafted polymer coating covering said polymer fibers, wherein said multimodal ligands are covalently coupled to said grafted polymer coating, or optionally further comprising a plurality of grafted polymer molecules covalently tethered to said polymer fibers, wherein at least a portion of said multimodal ligands are covalently coupled to said grafted polymer molecules.

8. The separation matrix of claim 7, wherein said grafted polymer molecules are polyglycidol polymer molecules or polyglycidol copolymer molecules.

9. The separation matrix of claim 7, wherein said polymer fibers with said grafted polymer molecules or grafted polymer coating have diameters of 100-1000 nm.

10. The separation matrix of claim 1, having an average pore size of 200-800 nm.

11. The separation matrix of claim 1, having a bubblepoint pore size of 0.9-1.2 pm.

12. The separation matrix of claim 1, having a smallest pore size of 0.2-0.4 pm.

13. The separation matrix of claim 1, having a mean flow pore (MFP) size of 0.3-0.5 pm.

14. The separation matrix of claim 1, having a pore volume fraction of 50-90%.

15. The separation matrix of claim 1, having a ligand density of 100-2000 μmol ligands per g dry separation matrix.

16. The separation matrix of claim 1, wherein the pressure drop over the separation matrix is less than 1 MPa per mm bed height when an aqueous liquid phase of viscosity less than 1.2 mPas is passed through a thickness of 0.05 to 10 mm of the matrix at a flow rate of between 1 to 640 medium volumes per minute.

17. The separation matrix of claim 1, wherein the pressure drop over the separation matrix is less than 2 MPa when an aqueous liquid phase of viscosity less than 1.2 mPas is passed through a thickness of 0.05 to 10 mm of the matrix at a flow rate of between 1 to 640 medium volumes per minute.

18. The separation matrix of claim 1, wherein when an aqueous buffer of pH 5-8 is passed through the separation matrix at 0.4 s residence time, the pressure drop over the separation matrix changes by less than 0.07 MPa per mm bed height when the conductivity of the buffer is changed over an interval of 3-90 mS/cm.

19. The separation matrix of claim 7, wherein the grafted polymer molecules or grafted polymer coating comprise polymer molecules which are single-point covalently tethered to polymer nanofibers.

20. The separation matrix of claim 7, wherein the grafted polymer molecules or grafted polymer coating comprise branched polymer molecules.

21. The separation matrix of claim 7, wherein the grafted polymer molecules or grafted polymer coating comprise glycidol monomer residues.

22. The separation matrix of claim 7, wherein the grafted polymer molecules or grafted polymer coating comprise divinylsulfone monomer residues.

23. The separation matrix of claim 1, wherein said multimodal cation exchange ligands comprise ligands of structure $SR_4$ (COOH)—N(H)C(O)$R_5$ coupled to the support via the sulfur, wherein: $R_4$ is a C2-C6 alkylene group; and $R_5$ is a five- or six-membered, substituted or non-substituted, aromatic or aliphatic ring structure.

24. The separation matrix of, wherein said multimodal cation exchange ligands comprise ligands of structure

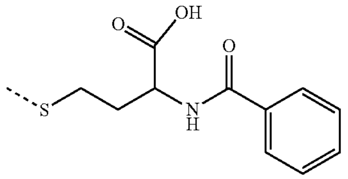

coupled to the support via the sulfur.

25. The separation matrix of claim 1, wherein said multimodal cation exchange ligands comprise vinyl sulfonate-co-N-vinyl pyrrolidone copolymer chains.

26. A method of recovering a purified biomacromolecule from a load fluid including one or more impurities, comprising the steps of:

a) passing the load fluid through the separation matrix of claim 1; and b) recovering the purified biomacromolecule in the matrix effluent during the load cycle and optionally during any essentially isocratic wash.

27. The method of claim 26, wherein the biomacromolecule is a protein.

28. A method of recovering a purified biomacromolecule from a load fluid including one or more impurities, comprising the steps of:

a) passing the load fluid through the separation matrix of claim 1;

b) optionally passing a wash fluid through the separation matrix;

c) passing an eluent through the separation matrix;

d) recovering the purified biomacromolecule in the eluent after passage through the separation matrix; and e) passing a regeneration fluid through the separation matrix.

29. The method of claim 28, wherein the biomacromolecule is a protein.

30. The method of claim 28, wherein steps a)-e) are repeated at least 10 times.

31. The method of claim 28, wherein a total cycle time for the sequence of steps a)-e) is less than 5 minutes.

32. The method of claim 26, wherein said load fluid is an eluate from a preceding affinity chromatography step.

33. The method of claim 32, wherein the biomacromolecule is an immunoglobulin and said affinity chromatography step is a Protein A step.

34. The method of claim 32, wherein said affinity chromatography step is performed on a separation matrix comprising a plurality of affinity ligands covalently coupled to a support membrane comprising nonwoven polymer fibers.

* * * * *